United States Patent Office 3,294,555
Patented Dec. 27, 1966

3,294,555
METHOD OF MIXING GLASS BATCH
Stanley M. Krinov, Lexington, Mass., assignor to Pittsburgh Plate Glass Company, Pittsburgh, Pa., a corporation of Pennsylvania
No Drawing. Filed Feb. 8, 1963, Ser. No. 257,112
4 Claims. (Cl. 106—47)

This application is a continuous-in-part of my copending application, Serial No. 836,087, filed August 26, 1959, and now abandoned.

The present invention relates to the manufacture of glass. More particularly, the present invention relates to improvements in the preparation, mixing and handling of batches of glass making ingredients for use in a glass forming furnace.

In the manufacture of glass many problems are encountered during the mixing and melting operation which seriously interfere with the efficiency and economy of the over-all glass making operation. Thus, considerable carry-over from dust furnaces is one particularly bothersome problem encountered which may require the employment of extensive dust trapping and collection equipment on furnace flues. Another associated problem concerns the occurrence of considerable internal dusting in the melting furnaces employed. Internal furnace dust contains alkali ingredients of the glass batches employed which causes considerable damage within the furnace to refractory linings necessitating costly and frequent shutdown for replacement or repair of these linings. Still further, considerable quantities of glass often are rejected because of the existence therein of blisters caused by trapped gases in the melted glass batches. Also, quite frequently seeds or unmelted sand particles are found in the glass products which render the product unsatisfactory.

Many of the above enumerated disadvantages may be eliminated or greatly minimized by adding to the glass batch ingredients quantities of water. Generally, water additions in the range of from 1 percent to 3 percent by weight of the batch are employed and when employed substantially reduce the dusting characteristics of the batching ingredients. In addition, water addition to the glass batch ingredients renders the glass batches when mixed more uniform in the distribution of the various batch components. Water additions above a 3 percent range, that is, water additions of from 5 percent to 20 percent by weight of the batch are very beneficial in imparting to the batch ingredients enhanced melting characteristics in addition to eliminating undesirable dusting characteristics. Thus it is found that water additions ranging between 5 percent and 20 percent by weight of the batch impart to the batch ingredients increased melting rates. Increased melting rates contribute substantially to the reduction of seeds or blisters in melted glass batches and thus eliminate one or more of the serious problems affecting glass making operations. Faster melting rates coupled with the reduction in dusting achieved by these increased water additions renders the process very desirable in any glass making operation.

The addition of water to glass batch making ingredients which include an alkali metal carbonate such as soda ash as the alkali ingredient in amounts above 5 percent, for example, in a range between 5 percent and 20 percent by weight of the batch while increasing the melting rates of the batch ingredients to which it is added, does impart to the batch ingredients a deleterious property. Thus, when water is added to batch ingredients in amounts ranging between 5 percent and 20 percent by weight of batch, the resulting mixtures are more susceptible to setting up or hardening during standing than batch mixtures which employ water in ranges below 2 percent or 3 percent by weight. This setting-up tendency of batch ingredients containing appreciable amounts of water can be extremely costly in any glass making operation since the set-up masses are quite frequently so solidly formed that pneumatic hammers and other types of traumatic equipment must be employed to break up the masses. In addition, setting-up of batch ingredients in storage bins and feeders can damage the equipment when removal is attempted.

According to the present invention, it has been found that water additions in a range between 5 percent and 20 percent by weight of the batch can be made to glass ingredients containing an alkali metal carbonate thus imparting to the batch ingredients enhanced melting characteristics while avoiding the setting-up characteristics of the batch normally encountered with water additions of this magnitude.

Thus, it has been found that by adding 5 percent to 20 percent by weight of water to batch ingredients containing an alkali metal carbonate during the mixing of the batch ingredients and maintaining the mixtures under controlled temperature conditions during mixing, successful elimination of the undesirable setting-up characteristics normally expected from a glass batch mixture of such high moisture content is readily avoided.

In preparing and mixing glass batch ingredients which include soda ash for feeding to a glass forming furnace, the glass batch ingredients are mixed with between 5 percent and 20 percent by weight of water. During the mixing the batch ingredients are cooled and mixed at a temperature below 70° F. The resulting mixture when discharged from the mixing devices are found upon prolonged standing not to exhibit the setting-up characteristics normally encountered when water additions in this range are attempted. Conveniently temperature control of the ingredients undergoing mixing is achieved by cooling and mixing the glass batch ingredients, including soda ash, in a dry state for about 50 percent to 75 percent of the normal mixing time. During the latter 25 percent to 50 percent of the mixing time water in a range of 5 percent to 20 percent by weight of the batch is added to the ingredients. To maintain the temperature of the ingredients below the desired 70° F. limit during the water addition stage of the process, it is desirable to cool the dry ingredients during the first half to three quarters of the time the ingredients are undergoing mixing to a temperature of about 10° F. to 30° F. In addition, it is desirable to add cold water to the batch ingredients, that is, water at a temperature at or below the 50° F. level, preferably between 35° F. and 40° F. Generally it is preferable to conduct cooling continuously during the mixing operation to insure adequate temperature control of the batch mixture though intermittent cooling may be employed.

While it is not intended that the application be restricted by any particular theory involved, it is believed that the enhanced charcteristics imparted to glass batches employing appreciable quantities of water in accordance with this invention are achieved by the rapid formation of higher hydrates of soda ash such as sodium decahydrate ($Na_2CO_3 \cdot 10H_2O$) and sodium heptahydrate $$(Na_2CO_3 \cdot 7H_2O)$$

during the mixing operation. Under ordinary circumstances, high water additions to glass batch ingredients as herein contemplated, result in the formation of decahydrates and heptahydrates of alkali metal carbonate contained in the batch ingredients when they are permitted to stand after the mixing operation. This formation of crystals serves to bind the sand, coloring agent and other components of the batch into a solid mass. This phenomenon is known in the art as setting-up of the batch. By cooling the glass batch ingredients to which appreciable quantities of water have been added, decahydrates and heptahydrates and mixtures thereof are believed formed during the mixing operation. Since they are formed during the mixing operation, the crystals are rapidly broken up so that upon completion of the mixing operation there is no tendency for the higher hydrated crystals which have been broken up during mixing to re-orient themselves with one another and other particles of the glass batch ingredients to form a solid mass. Some encasement of sand and other batch particles with alkali hydrates occurs which imparts uniform distribution of batch ingredients but the production of solid crystalline masses such as occur when a batch sets up is not encountered.

Glass batch ingredients prepared in accordance with this invention may be utilized as formed in the mixing devices in a glass forming furnace for the purpose of making glass. If desired further enhanced melting characteristics can be imparted to the glass batches so prepared by heating the mixtures prior to feeding to the glass forming furnaces to temperatures in the range of 90° F. to 200° F. Heating glass batch ingredients prepared as above described to temperatures above 90° F. results in the formation of a wet, homogeneous, free-flowing mixture which may be fed directly to a glass forming furnace and will exhibit extremely fast melting times.

The cooling of the glass batch ingredients in accordance with this invention may be accomplished in many various ways. Thus if desired, all glass batch ingredients fed to the mixing devices may be cooled by storage in cold storage spaces or outdoors during winter months. Water added to the batch ingredients likewise may be cooled suitably by any conventional refrigeration equipment. Preferably, cooling is accomplished by refrigerating the mixing equipment employed in producing the glass batch making ingredients. Thus, suitable cooling coils may be inserted either on the interior or the exterior of the mixing devices and appropriate gas or liquids circulated in the coils to maintain the temperature of the mixtures undergoing mixing below the required 70° F. temperature. Water additions during the mixing operation may be acomplished in any conventional way by the employment of suitable spraying devices, hoses, and the like.

The alkali employed in the glass making mixtures contemplated are alkali metal salts such as sodium carbonate, potassium carbonate, sodium bicarbonate and mixtures thereof. Sodium salts are most commonly employed in the preparation of glass batch ingredients with soda ash forming the preferred alkali metal salt. The quantities of water added to the glass batch ingredients range between 5 percent and 20 percent by weight of the batch and preferably somewhere between 10 percent and 15 percent by weight of the batch ingredients.

The time required for preparing any particular batch of glass making ingredients is subject to considerable variation depending on the nature of the batch itself, the quantity of the alkali employed or the quantity of water added to the batch ingredients and the necessary reduction in temperature required to produce the effect desired. In general, the dry glass making ingredients to which the water is added are mixed thoroughly in mechanical devices such as pug mills, rotary mills, tumblers, mix mullers and other like mixing devices. Any device which will impart to the particles of the glass batch ingredients maximum dispersion is conveniently employed.

If desired as a further refinement in obtaining a maximum wetting of the batch particles contacted with the water during the mixing operation suitable wetting agents may be employed in connection with the mixing operations. Thus, if desired, wetting agents may be added to the glass batch ingredients to insure thorough wetting of these particles with the water solution contacted therewith. In a similar manner, wetting agents may be added to the water contacted with the glass batch making ingredients prior to the introduction of the water to the batch ingredients. Any conventional wetting agents may be employed such as alkylaryl sulfonates and other like materials. Utilization of wetting agents in the water contacted with the batch ingredients is beneficial in providing a uniform wetting of batch ingredients during the mixing operation.

In a typical operation employing this novel process, the glass batch ingredients are fed to a mixing device from appropriate storage bins. Thus to a mixing device such as a mix muller the appropriate quantity of sand, soda ash, coloring ingredients and/or other additive materials necessary for the production of a particular type of glass are added.

The mixing device is equipped with cooling coils on its exterior surface and the coils have a cooled liquid such as brine circulating therein to provide an internal temperature in the mixture of about 35° F. The mixer is actuated and the batch ingredients are mixed in a dry state for a period of 2 to 3 minutes. Upon completion of this initial mixing period cold water representing between 5 percent and 20 percent by weight of the batch ingredients is added to the mixing device through a suitable spray nozzle located on the cover of the mixer. Mixing after the addition of the water is continued for from one-half to one minute or more if desired. Upon completion of the mixing operation the contents of the mixer are deposited in suitable containers or onto a conveyor belt for feeding to a glass forming furnace. If desired, the ingredients may be fed directly from the mixing device to a conveyor belt and from the conveyor belt to a vibrating feeding mechanism which feeds the material directly to a furnace. If, on the other hand, considerable periods of time are to elapse between the mixing operation and the feeding of the batch ingredients to a glass forming furnace, the material may be conveyed to suitable storage bins for later use. It is found that ingredients prepared in accordance with the above described procedure may be stored for periods of days or even weeks without any difficulty encountered with respect to setting-up of the batch ingredients. Thus, any time it is desired to feed material which has been stored after being mixed in the above described manner, it is a relatively simple matter to discharge it from the storage bins and place it in a glass forming furnace.

For more complete understanding of the present invention, reference is made to the following examples which are typical illustrations of methods which may be employed in conducting the present invention.

*Example I*

A soda lime glass batch is prepared from the following ingredients:

| | Grams |
|---|---|
| Sand | 200 |
| Limestone | 50 |
| Soda ash | 70 |

The 200 grams of sand, 50 grams of limstone and 70 grams of soda ash are placed in an electric laboratory mix muller equipped with cooling coils on its outer surface. Circulating in the cooling coils is a brine mixture operated at a temperature of 20° F. The mix muller is actuated and the dry ingredients thoroughly mixed for a period of 3 minutes. The dry ingredients are at a temperature of about 40° F. At the end of this period of time 48 grams of tap water at a temperature of 40° F. is added to the batch ingredients contained within the mix muller. The contents of the mix muller are thoroughly mixed for an additional period of one and one-half minutes. On completion of the mixing operation, the contents are placed in open glass containers and permitted to stand for a period of 7 days. At the end of this period of time the batch ingredients are taken from the glass jars simply by inverting them. The mixture contained in the jars is free flowing and does not exhibit any hardening or massing characteristics. The 20 gram mixture taken from the jars is placed in a ceramic crucible. The crucible is placed in an electric muffle furnace operated at 2600° F. for 30 minutes. The crucible is removed from the furnace, cooled and a batch free soda-lime glass obtained.

*Example II*

A soda-lime glass batch is obtained from the following ingredients:

|  | Grams |
|---|---|
| Sand | 200 |
| Limestone | 50 |
| Soda ash | 70 |

The 200 grams of sand, 50 grams of limestone and 70 grams of soda ash are placed in an electric laboratory mix muller. The electric mix muller is equipped with cooling coils as described in Example I and the temperature of the coolant is the same as in Example I. The mixer is actuated and the dry ingredients thoroughly mixed for a period of 2 minutes. The dry mixture is at a temperature of 40° F. After 2 minutes the mix muller is turned off and 48 grams of tap water at a temperature of 40° F. is added to the muller. The muller is once again actuated and mixing continued for a period of one and one-half minutes. The muller is once again shut off and the contents placed in an open glass jar for a period of 7 days at ambient temperature (77° F.). After 7 days the contents of the glass jar are removed therefrom by inverting the jar and pouring them into a ceramic crucible. A 20 gram sample of the mixture obtained from the glass jars and placed in a ceramic crucible is first heated to a temperature of 90° F. The mixture upon obtaining this temperature is free flowing, wet, homogeneous mass. The wet homogeneous mixture is then placed in an electric muffle furnace operated at a temperature of 2600° F. for a period of 30 minutes. The crucible is then removed from the furnace, cooled and a batch free soda-lime glass obtained.

The term "batch free" as used herein in the specification and claims indicates a glass which contains substantially no unmelted sand particles or seed therein.

While the invention has been described with reference to certain specific examples, it is not intended that the invention be so limited except insofar as it appears in the accompanying claims.

I claim:
1. In a method of mixing glass batch ingredients including alkali metal carbonate for use as a feed in a glass forming furnace, the improvement comprising mixing the glass batch ingredients with between 5 percent and 20 percent by weight of water basis the weight of the batch ingredients and cooling the glass batch ingredients during said mixing to a temperature between 10° F. and 70° F. to thereby form higher hydrates of said alkali metal carbonate.

2. In a method of mixing glass batch ingredients including soda ash for use as feed in a glass forming furnace, the improvement comprising mixing the glass batch ingredients with between 5 percent and 20 percent by weight of water basis the weight of the batch ingredients and cooling the glass batch ingredients during said mixing to a temperature between 10° F. and 70° F. to thereby form higher hydrates of said soda ash.

3. In a method of mixing glass batch ingredients including soda ash for use as feed in a glass forming furnace, the improvement comprising mixing the glass batch ingredients with above 5 percent by weight of water basis the weight of the batch ingredients and cooling the glass batch ingredients during said mixing to a temperature between 10° F. and 70° F. to thereby form higher hydrates of said soda ash.

4. In a method of mixing glass batch ingredients including alkali metal carbonates for use as feed in a glass forming furnace, the improvement comprising mixing the glass batch ingredients with above 5 percent by weight of water basis the weight of the batch ingredients and cooling the glass batch ingredients during said mixing to a temperature between 10° F. and 70° F. to thereby form higher hydrates of said alkali metal carbonate.

References Cited by the Examiner

UNITED STATES PATENTS 2,813,036  11/1957  Poole _____ 106—52

FOREIGN PATENTS 3,149,983  9/1964  Belgium.

TOBIAS E. LEVOW, *Primary Examiner.*

HELEN M. McCARTHY, *Examiner.*